United States Patent
Sorkine-Hornung et al.

(10) Patent No.: US 9,786,062 B2
(45) Date of Patent: Oct. 10, 2017

(54) SCENE RECONSTRUCTION FROM HIGH SPATIO-ANGULAR RESOLUTION LIGHT FIELDS

(71) Applicant: DISNEY Enterprises, Inc., Burbank, CA (US)

(72) Inventors: Alexander Sorkine-Hornung, Zurich (CH); Changil Kim, Zurich (CH); Henning Zimmer, Zurich (CH); Yael Pritch, Zurich (CH); Markus Gross, Uster (CH)

(73) Assignees: Disney Enterprises, Inc., Burbank, CA (US); ETH Zurich (Eidgenoessische Technische Hochschule Zurich), Zurich (CH)

( * ) Notice: Subject to any disclaimer, the term of this patent is extended or adjusted under 35 U.S.C. 154(b) by 582 days.

(21) Appl. No.: 13/944,337

(22) Filed: Jul. 17, 2013

(65) Prior Publication Data
US 2014/0327674 A1 Nov. 6, 2014

Related U.S. Application Data

(60) Provisional application No. 61/820,099, filed on May 6, 2013.

(51) Int. Cl.
*G06K 9/00* (2006.01)
*G06T 7/557* (2017.01)
(Continued)

(52) U.S. Cl.
CPC ............... *G06T 7/557* (2017.01); *G06T 7/50* (2017.01); *G06T 7/593* (2017.01);
(Continued)

(58) Field of Classification Search
None
See application file for complete search history.

(56) References Cited

U.S. PATENT DOCUMENTS

| 6,738,533 B1 * | 5/2004 | Shum | G06T 15/205 |
| | | | 382/299 |
| 8,290,358 B1 * | 10/2012 | Georgiev | G03B 35/10 |
| | | | 396/326 |

(Continued)

OTHER PUBLICATIONS

Wanner et al., "Generating EPI Representations of 4D Light Fields with a Single Lens Focused Plenoptic Camera", Lecture Notes in Computer Science, vol. 6938, 2011, pp. 90-101.*

(Continued)

*Primary Examiner* — Matthew Bella
*Assistant Examiner* — Hose M Torres
(74) *Attorney, Agent, or Firm* — Patterson + Sheridan, LLP

(57) ABSTRACT

The disclosure provides an approach for estimating depth in a scene. According to one aspect, regions where the depth estimation is expected to perform well may first be identified in full-resolution epipolar-plane images (EPIs) generated from a plurality of images of the scene. Depth estimates for EPI-pixels with high edge confidence are determined by testing a number of discrete depth hypotheses and picking depths that lead to highest color density of sampled EPI-pixels. The depth estimate may also be propagated throughout the EPIs. This process of depth estimation and propagation may be iterated until all EPI-pixels with high edge confidence have been processed, and all EPIs may also be processed in this manner. The EPIs are then iteratively downsampled to coarser resolutions, at which edge confidence for EPI-pixels not yet processed are determined, depth estimates of EPI-pixels with high edge confidence made, and depth estimates propagated throughout the EPIs.

27 Claims, 4 Drawing Sheets
(2 of 4 Drawing Sheet(s) Filed in Color)

(51) Int. Cl.
 *G06T 7/593* (2017.01)
 *G06T 7/50* (2017.01)
(52) U.S. Cl.
 CPC .......... *G06T 2207/10016* (2013.01); *G06T 2207/10052* (2013.01); *G06T 2207/20016* (2013.01)

(56) References Cited

U.S. PATENT DOCUMENTS

| | | | | |
|---|---|---|---|---|
| 8,917,956 | B1* | 12/2014 | Yang | G09G 3/2044 345/698 |
| 2007/0024614 | A1* | 2/2007 | Tam | G06T 7/0067 345/419 |
| 2007/0242872 | A1* | 10/2007 | Rudin | G06T 7/593 382/154 |
| 2011/0274366 | A1* | 11/2011 | Tardif | G06T 5/002 382/260 |
| 2012/0321172 | A1* | 12/2012 | Jachalsky | G06T 7/0075 382/154 |
| 2013/0170736 | A1* | 7/2013 | Guo | G06T 7/0075 382/154 |
| 2014/0146139 | A1* | 5/2014 | Schwartz | H04N 13/0018 348/43 |
| 2014/0267243 | A1* | 9/2014 | Venkataraman | G06T 7/557 345/419 |

OTHER PUBLICATIONS

Magnor et al., "Multi-View Image Coding with Depth Maps and 3-D Geometry for Prediction", Proceedings of SPIE vol. 4310, 2001, pp. 263-271.*
Basha et al., "Structure and Motion from Scene Registration", IEEE Conference on Computer Vision and Pattern Recognition, Jun. 16-21, 2012, pp. 1426-1433.*
Kim et al., "Scene Reconstruction from High Spatio-Angular Resolution Light Fields", ACM Transactions on Graphics (TOG)—SIGGRAPH 2013 Conference Proceedings, vol. 32 No. 4, Jul. 2013, pp. 1-12.*
Tao et al., "Depth from Combining Defocus and Correspondence Using light-Field Cameras", Proceedings of International Conference on Computer Vision (ICCV), Dec. 2013, pp. 1-8.*
Geys et al., "Hierarchical coarse to fine depth estimation for realistic view interpolation", Fifth International Conference on 3-D Digital Imaging and Modeling, Jun. 13-16, 2005, pp. 237-244.*
Dorea et al., "Reconstruction of coarse depth estimates using hierarchical image partitions", Multidimensional Systems and Signal Processing, vol. 24 No. 2, Jun. 2013, pp. 379-393.*
Das et al., "Active surface estimation: integrating coarse-to-fine image acquisition and estimation from multiple cues", Artificial Intelligence, vol. 83 No. 2, Jun. 1996, pp. 241-266.*
Dubbelman et al., "Obstacle Detection during Day and Night Conditions using Stereo Vision", Proceedings of the 2007 IEEE/RSJ International Conference on Intelligent Robots and Systems, San Diego, CA, USA, Oct. 29-Nov. 2, 2007, pp. 109-116.*
Zitnick, C. L., Kang, S. B., Uyttendaele, M., Winder, S., and Szeliski, R. 2004. High-quality video view nterpolation using a layered representation. In SIGGRAPH, 600-608.
Zhu, Z., Xu, G., and Lin, X 1999. Panoramic EPI generation and analysis of video from a moving platform with iibration. In CVPR.
Georgiev, T., and Lumsdaine, A. 2010. Reducing plenoptic camera artifacts. Comp. Graph. Forum 29, 6, 1955-1968.
Humayun, A., Mac Aodha, O., and Brostow, G. 2011. Learning to find occlusion regions. In CVPR.
Sylwan, S. 2010. The application of vision algorithms to visual effects production. In ACCV, 189-199.
Adelson, E. H., and Wang, J. Y. A. 1992. Single lens stero with a plenoptic camera. IEEE Trans. Pattern Anal. Mach. Intell. 14, 2, 99-106.

Ayvaci, A., Raptis, M., and Soatto, S. 2012. Sparse occlusion detection with optical flow. IJCV 97, 3, 322-338.
Basha, T., Avidan, S., Hornung, A., and Matusik, W. 2012. Structure and motion from scene registration. In CVPR, 1426-1433.
Beeler, T., Bickel, B., Beardsley, P. A., Sumner, B., and Gross, M. H. 2010. High-quality single-shot capture of facial geometry. ACM Trans. Graph. 29, 4.
Bishop, T. E., and Favaro, P. 2010. Full-resolution depth map estimation from an aliased plenoptic light field. In ACCV (2), 186-200.
Bishop, T., Zanetti, S., and Favaro, P. 2009. Light field superresolution. In ICCP.
Bleyer, M., Rother, C., Kohli, P., Scharstein, D., and Sinha, S. 2011. Object stereo—joint stereo matching and object segmentation. In CVPR.
Bolles, R. C., Baker, H. H., and Marimont, D. H. 1987. Epipolar-plane image analysis: An approach to determining structure from motion. IJCV 1, 1, 7-55.
Buehler, C., Bosse, M., McMillan, L., Gortler, S. J., and Cohen, M. F. 2001. Unstructured lumigraph rendering. In SIGGRAPH, 425-432.
Pech, J., and Šaára, R. Efficient sampling of disparity space for fast and accurate matching. In CVPR.
Chai, J., Chan, S.-C., Shum, H.-Y., and Tong, X. 2000. Plenoptic sampling. In SIGGRAPH, 307-318.
Chen, W.-C., Bouguet, J.-Y., Chu, M. H., and Grzeszczuk, R. 2002. Light field mapping: Efficient representation and hardware rendering of surface light fields. In SIGGRAPH, 447-456.
Comaniciu, D., and Meer, P. 2002. Mean shift: A robust approach toward feature space analysis. IEEE Trans. Pattern Anal. Mach. Intell. 24, 5, 603-619.
Criminisi, A., Kang, S. B., Swaminathan, R., Szeliski, R., and Anandan, P. 2005. Extracting layers and analyzing their specular properties using epipolar-plane-image analysis. CVIU 97, 1, 51-85.
Davis, A., Levoy, M., and Durand, F. 2012. Unstructured light fields. Comput. Graph. Forum 31, 2, 305-314.
Fitzgibbon, A., Wexler, Y., and Zisserman, A. 2005. Image-based rendering using image-based priors. IJCV 63, 2, 141-151.
Furukawa, Y., and Ponce, J. 2010. Accurate, dense, and robust multi-view stereopsis. IEEE Trans. Pattern Anal. Mach. Intell. 32, 8, 1362-1376.
Furukawa, Y., Curless, B., Seitz, S. M., and Szeliski, R. 2010. Towards Internet-scale multi-view stereo. In CVPR.
Fusiello, A., Trucco, E., and Verri, A. 2000. A compact algorithm for rectification of stereo pairs. Mach. Vis. Appl. 12, 1, 16-22.
Geiger, A., Roser, M., and Urtasun, R. 2010. Efficient large-scale stereo matching. In ACCV.
Goldlücke, B., and Magnor, M. 2003. Joint 3Dreconstruction and background separation in multiple views using graph cuts. In CVPR.
Gortler, S. J., Grzeszczuk, R., Szeliski, R., and Cohen, M. F. 1996. The Lumigraph. In SIGGRAPH, 43-54.
Hirschmüller, H. 2005. Accurate and efficient stereo processing by semi-global matching and mutual information. In IEEE CVPR.
Isaksen, A., McMillan, L., and Gortler, S. J. 2000. Dynamically reparameterized light fields. In SIGGRPH, 297-306.
Kang, S. B., and Szeliski, R. 2004. Extracting view-dependent depth maps from a collection of images. IJCV 58, 2, 139-163.
Kolmogorov, V., and Zabih, R. 2001. Computing visual correspondence with occlusions via graph cuts. In ICCV.
Levoy, M., 751 and Hanrahan, P. 1996. Light field rendering. In SIGGRAPH, 31-42.
Liang, C.-K, Lin, T.-H., Wong, B.-Y., Liu, C., and Chenn, H. H. 2008. Programmable aperture photography: multiplexed light field acquisition. ACM Trans. Graph. 27, 3.
Ng, R., Levoy, M., Bite 756 Dif, M., Duval, G., Horowitz, M., and Hanrahan, P. 2005. Light field photography with a hand-held plenoptic camera. Comp. Sci. Techn. Rep. CSTR 2.
Rav-Acha, A., Shor, Y., and Peleg, S. 2004. Mosaicing with parallax using time warping. In CVPR Workshop.
Rhemann, C., Hosni, A., Bleyer, M., Rother, C., and Gelautz, M. 2011. Fast cost-volume filtering for visual correspondence and beyond. In CVPR.

(56) References Cited

OTHER PUBLICATIONS

Scharstein, D., and Szeliski, R. 2002. A taxonomy and evaluation of dense two-frame stereo correspondence algorithms. IJCV 47, 1-3, 7-42.

Schechner, Y. Y., and Kiryati, N. 2000. Depth from defocus vs. stereo: How different really are they? IJCV 39, 2, 141-162.

Seitz, S. M., and Dyer, C. R. 1999. Photorealistic scene reconstruction by voxel coloring. IJCT 35, 2, 151-173.

Seitz, S., Curless, B., Diebel, J., Scharstein, D., and Szeliski, R. 2006. A comparison and evaluation of multi-view stereo reconstruction algorithms. In CVPR, vol. 1, 519-528.

Snavely, N., Seitz, S. M., and Szeliski, R. 2008. Modeling the world from Internet photo collections. IJCV 80, 2, 189-210.

Stich, T., Tevs, A., and Magnor, M. A. 2006. Global depth from epipolar volumes-a general framework for reconstructing non-lambertian surfaces. In 3DPVT, 916-923.

Sun, X., Mei, X., Jiao, S., Zhou, M., and Wang, H. 2011. Stereo matching with reliable disparity propagation. In 3DIMPVT, 132-139.

Szeliski, R., and Scharstein, D. 2002. Symmetric sub-pixel stereo matching. In ECCV.

Vaish, V., Levoy, M., Szeliski, R., Zitnick, C., and Kang, S. 2006. Reconstructing occluded surfaces using synthetic apertures: Stereo, focus and robust measures. In CVPR.

Veeraraghavan, A., Raskar, R., Agrawal, A. K., Mohan, K., and Tumblin, J. 2007. Dappled photography: mask enhanced cameras for heterodyned light fields and coded aperture refocusing. ACM Trans. Graph. 26, 3, 69.

Vu, H.-H., Keriven, R., Labatut, P., and Pons, J.-P. 2009. Towards high-resolution large-scale multi-view stereo. In CVPR.

Wanner, S., and Goldlücke, B. 2012. Globally consistent depth labeling of 4D light fields. In CVPR, 41-48.

Wanner, S., Fehr, J., and Jaehne, B. 2011. Generating EPI representations of 4D light fields with a single lens focused plenoptic camera. In IISVC.

Wilburn, B., Joshi, N., Vaish, V., Talvala, E-V., Antúnez, E. R., Barth, A. Adams, A., Horowitz, M., and Levoy, M. 2005. High performance imaging using large camera arrays. ACM Trans. Graph. 24, 3, 765-776.

Wood, D. N., Azuma, D. I., Aldinger, K., Curless, B., Duchamp, T., Salesin, D. H., and Stuetzle, W. 2000. Surface light fields for 3D photography. In SIGGRAPH.

Yu, Y., Ferencz, A., and Malik, J. 2001. Extracting objects from range and radiance images. IEEE TVCG 7, 4, 351-364.

Zhang, C., and Chen, T. 2004. A self-reconfigurable camera array. In Rendering Techniques, 243-254.

Ziegler, R., Bucheli, S., Ahrenberg, L., Magnor, M. A., and Gross, M. H. 2007. A bidirectional light field—hologram transform. Comput. Graph. Forum 26, 3, 435-446.

Zitnick, C. L., and Kang, S. B. 2007. Stereo for image-based rendering using image over-segmentation. IJCV 75, 1, 49-65.

\* cited by examiner

SCENE RECONSTRUCTION FROM HIGH SPATIO-ANGULAR RESOLUTION LIGHT FIELDS

CROSS-REFERENCE TO RELATED APPLICATIONS

This application claims priority to U.S. provisional application having Ser. No. 61/820,099, filed on May 6, 2013, which is hereby incorporated by reference in its entirety.

BACKGROUND

Field

This disclosure provides techniques for scene reconstruction and, in particular, scene reconstruction of complex, detailed environments from light fields.

Description of the Related Art

Scene reconstruction in the form of depth maps, 3D point clouds, or 3D meshes has become increasingly important for digitizing, visualizing, and archiving the real word, in the movie and game industry as well as in architecture, archaeology, arts, and other areas. One approach for obtaining 3D models relies on laser scanning to collect scene data, from which 3D models are constructed. However, particularly in highly detailed, meticulously designed, and cluttered environments such as movie sets, a single laser scan may suffer from a considerable amount of missing data at occlusions. Multiple laser scans may instead be employed. In practice, artists commonly spend days manually cleaning up hundreds of merged laser scans before a model generated therefrom can be used in production.

Passive, image-based stereo techniques have also been developed. However, despite decades of continuous research efforts, current stereo approaches are not well suited for challenging applications such as movie production. These approaches typically involve some form of global optimization to obtain sufficiently smooth results, and are thus not sufficiently efficient to make use of high resolution images available through current camera hardware. Further, these approaches, which often proceed from coarse to fine resolutions and rely on patch-correlation, do not produce sufficiently accurate or reliable scene reconstructions (especially at object silhouettes) needed for many applications. In addition, these approaches typically cannot handle occlusions or scene inconsistencies such as moving elements.

SUMMARY

One aspect of the disclosure includes a computer implemented method for estimating depth in a scene. The method includes receiving a plurality of images of the scene, and, with the received images, estimating depths of scene points at multiple resolution levels, beginning from the finest resolution. At each of the resolution levels, edge confidence scores are determined for the scene points for which depth estimates have not yet been made, and depth estimates are made for the scene points associated with edge confidence scores higher than a threshold value.

Other aspects include a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the above recited aspects are attained and can be understood in detail, a more particular description of aspects of the disclosure, briefly summarized above, may be had by reference to the appended drawings.

It is to be noted, however, that the appended drawings illustrate only typical aspects of this disclosure and are therefore not to be considered limiting of its scope, for the disclosure may admit to other equally effective aspects.

Figure 1:
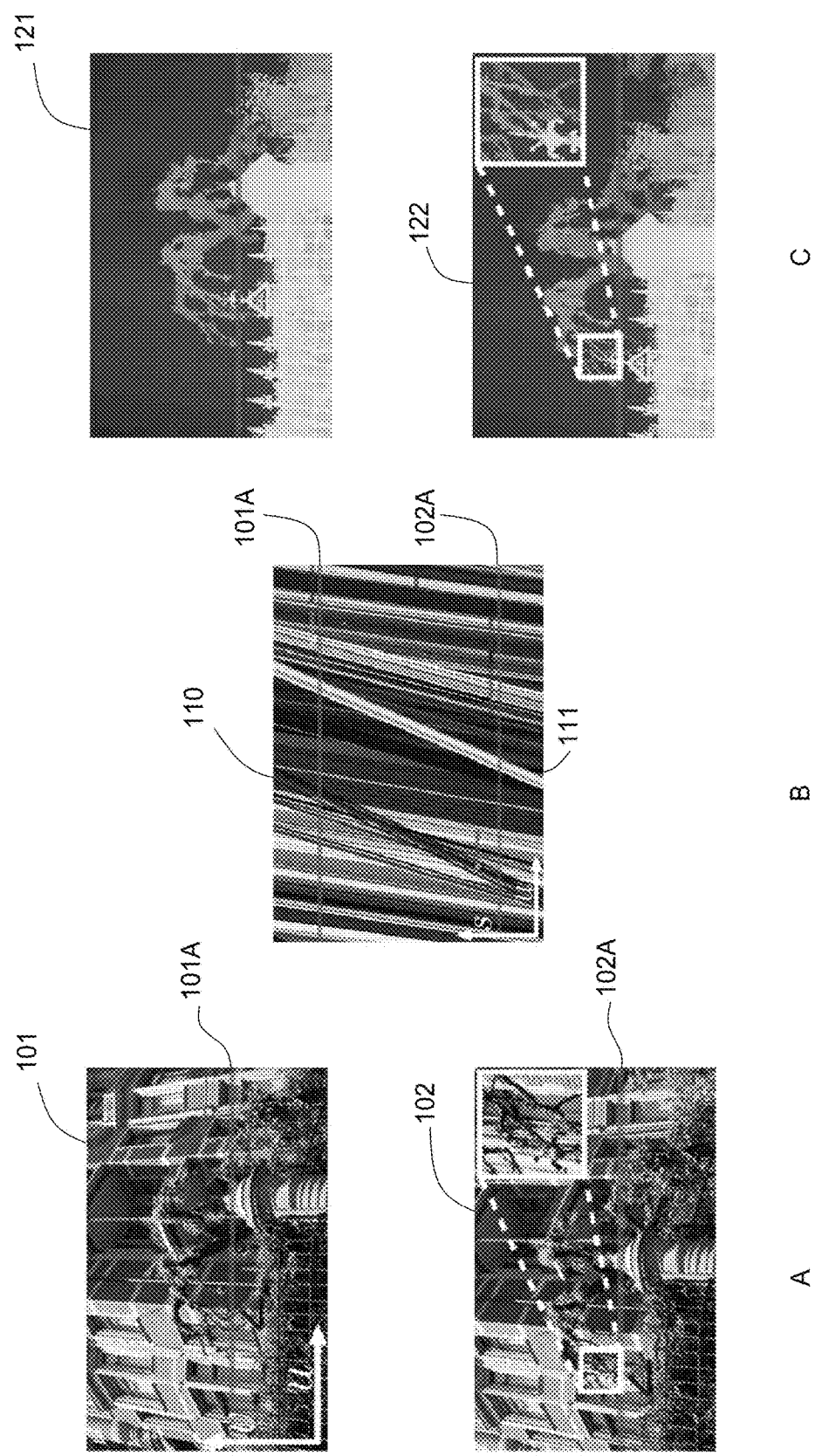

FIG. 1 illustrates an approach for estimating depth from high spatio-angular resolution light fields, according to an aspect of the disclosure.

Figure 2:
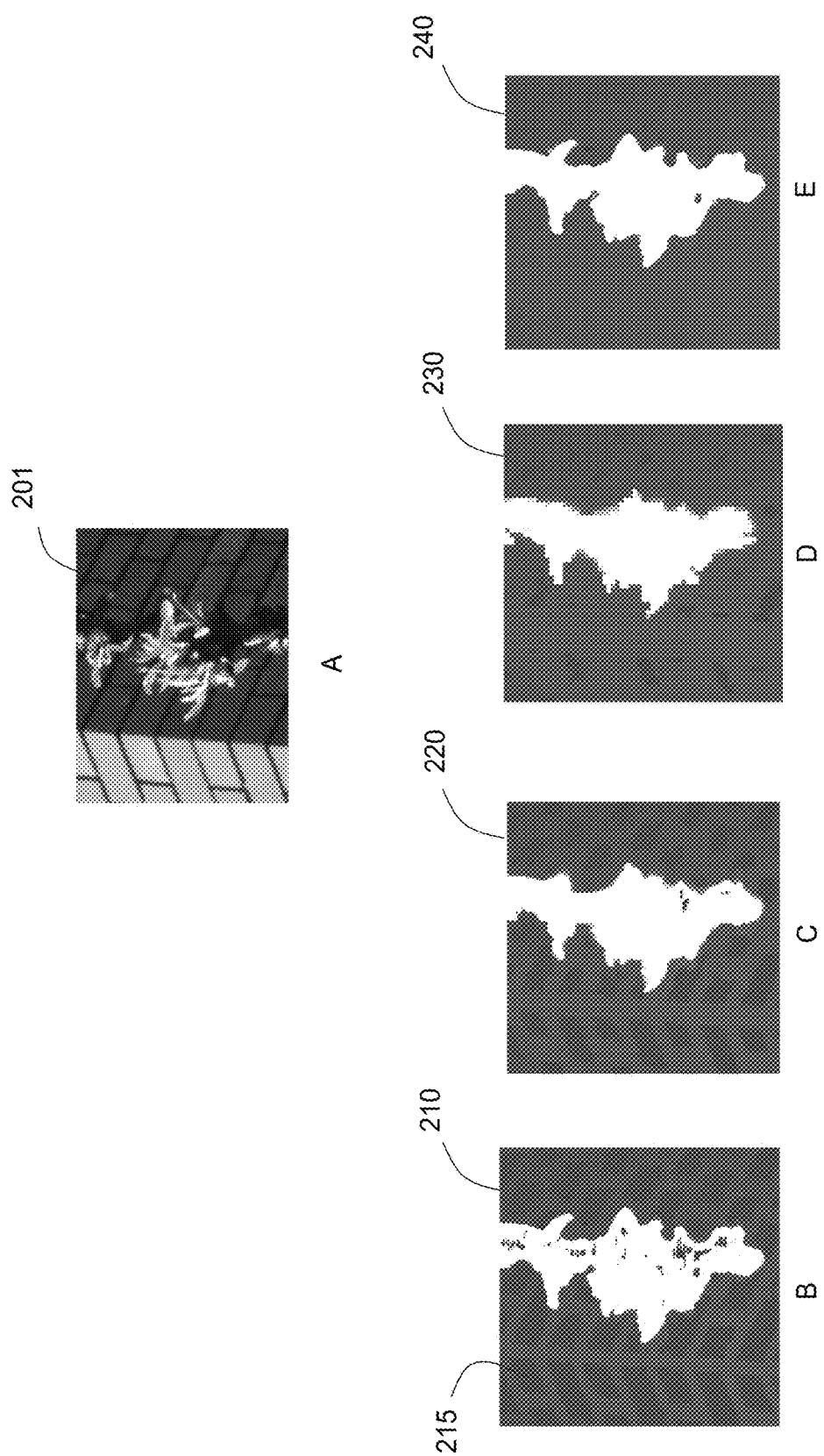

FIG. 2 illustrates a fine-to-coarse approach for depth estimation, according to an aspect of the disclosure.

Figure 3:
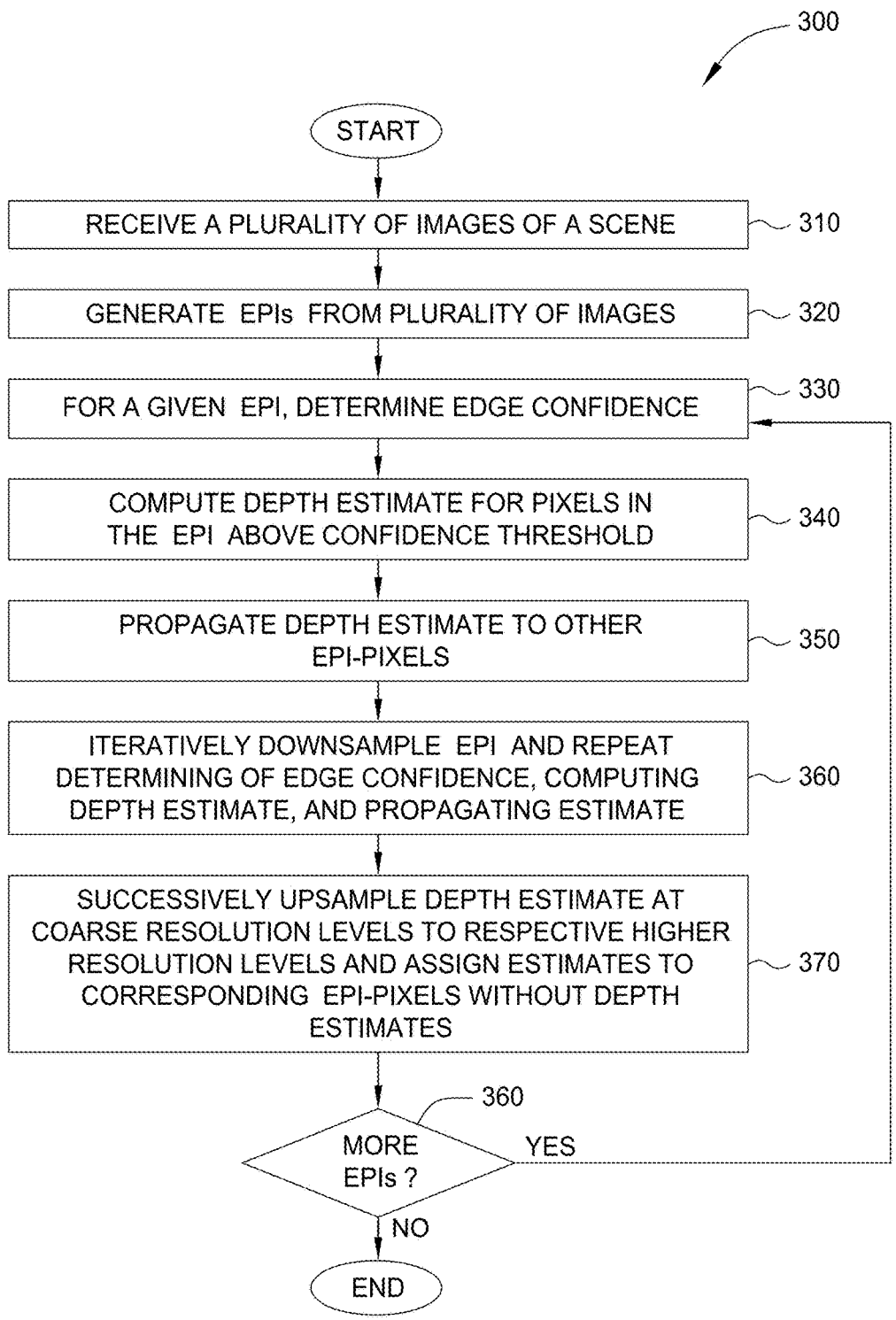

FIG. 3 illustrates a method for estimating depth in a scene, according to an aspect of the disclosure.

Figure 4:
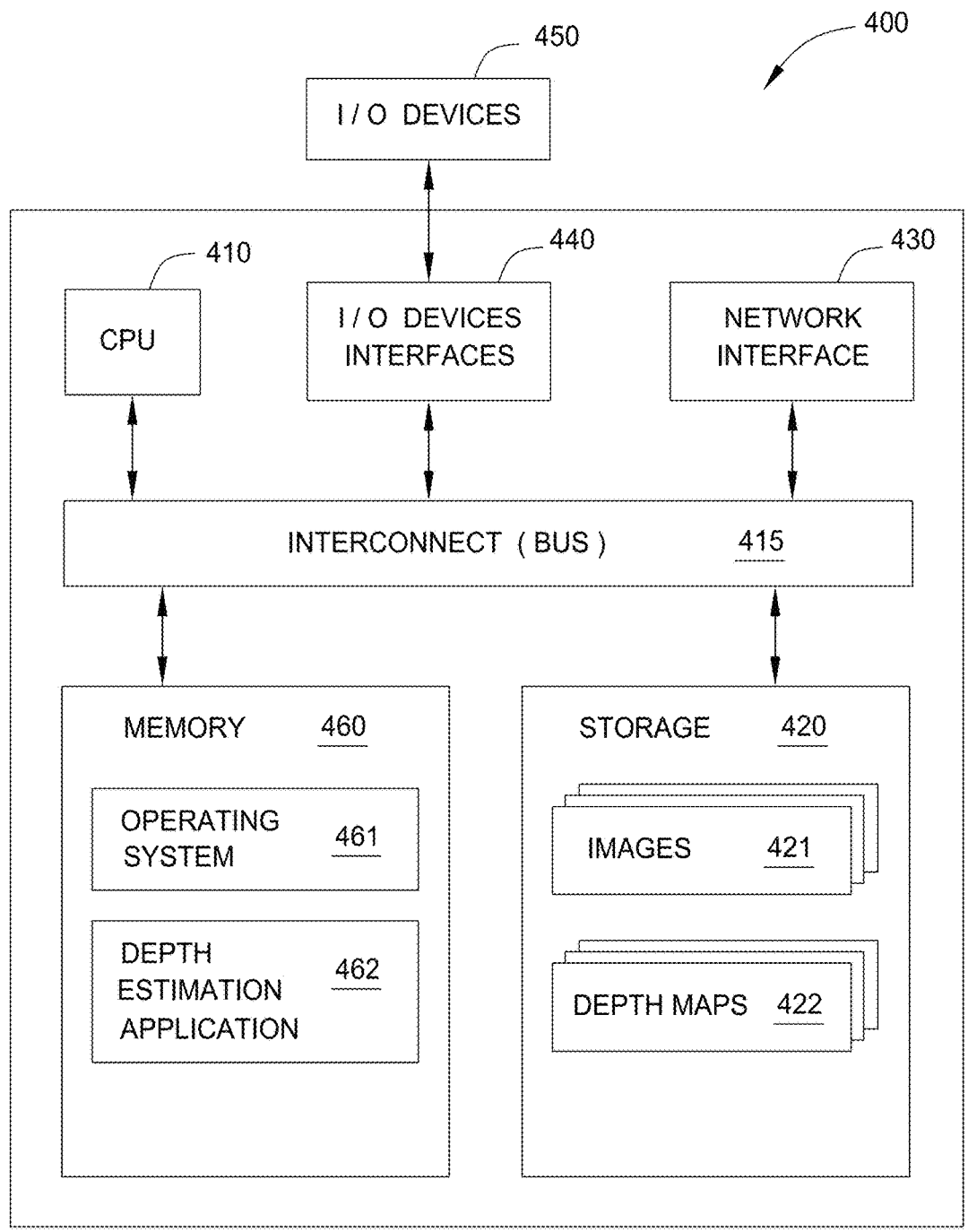

FIG. 4 depicts a block diagram of a system in which an aspect may be implemented.

DETAILED DESCRIPTION

Aspects disclosed herein provide techniques for estimating depth in a scene. Given a light field constructed from multiple images, fine-to-coarse depth estimation is used to compute reliable depth estimates first around object boundaries, then at more homogeneous interior regions. No global optimization is performed, permitting the retention of precise object contours while still ensuring smooth reconstructions in less detailed areas.

FIG. 1 illustrates an approach for estimating depth from high spatio-angular resolution light fields, according to an aspect of the disclosure. Illustratively, the light field may be a three-dimensional (3D) light field constructed from multiple high-resolution two-dimensional (2D) images with optical centers distributed along a one-dimensional (1D) line. Panel A shows two such 2D images 101, 102, which may be captured in any feasible manner, such as with a camera array, using a camera on a motorized linear stage, etc.

A 3D light field with radiance values captured in RGB color space may be denoted as a map L: $\mathbb{R}^3 \to \mathbb{R}^3$. The radiance $r \in \mathbb{R}^3$ of a light ray may then be given as r=L(u, v, s), where s describes the 1D ray origin and (u, v) represents the 2D ray direction. Here, s may be interpreted as different camera positions and/or cameras distributed along a 1D line, and (u, v) may be interpreted as pixel coordinates in a corresponding image $I_s$(u, v). It will be assumed herein, for the sake of simplicity, that u, v, s are regularly and uniformly sampled, i.e., the optical centers are uniformly spaced and all captured images are rectified, so that epipolar lines of a scene point coincide with the same horizontal scanline in all images. One way to achieve such regular and uniform sampling is by mounting a camera on a motorized linear stage, capturing images at a uniform spacing (e.g., 1 cm between camera positions), and approximating a regularly sampled 3D light field by correcting the captured images for lens distortion and compensating for mechanical inaccuracies of the motorized linear stage (by e.g., estimating the camera poses, computing the least orthogonal distance line from all camera centers as a baseline, and then rectifying all images with respect to the baseline).

A given u-v slice of the light field L for a fixed s corresponds to input image $I_s$, while a u-s slice for a fixed v coordinate corresponds to an "epipolar-plane image" (EPI), which is, intuitively, a stack of the same row v taken from all input images. Panel B illustrates an exemplary EPI 110.

As shown in panels A and B, lines 101*a*, 102*a* represent both the respective s-parameters of the two input images as well as the v-parameter in the input images from which the EPI 110 is constructed. Note, in panel A the lines 101*a*, 102*a* each mark a v coordinate, whereas in panel B the lines each mark an s coordinate.

An EPI will be denoted herein as $E_v: \mathbb{R}^2 \to \mathbb{R}^3$, with radiance $r=E_v(u, s)$ of a ray at a position $(u, s)$. EPIs of 3D light fields may exhibit high ray coherence and include redundant information. The term EPI-pixel (u, s) is used herein instead of the term ray at (u, s) for disambiguation. Further, the subscript v will be omitted for notational simplicity, as techniques disclosed herein consider mostly individual EPIs where the parameter v is fixed.

When the ray space of L is sampled densely enough, each scene point appears as a line segment in an EPI with the slope of the line segment depending on the scene point's depth. Panel B shows examples of such line segments 111 having slopes that depend on depth. Let Γ be the set of line segments originating at various locations in the input EPI E. Constructing Γ amounts to computing line slopes at the EPI pixels, i.e., estimating the depth of scene points. As discussed in greater detail below, a depth estimation application (not shown) may employ a fine-to-coarse strategy which estimates depth at edges in an EPI at a highest image resolution. Estimated depths are then propagated throughout the EPI (in s-direction), after which the EPI is iteratively downsampled to coarser resolutions, and depths which were not previously determined are estimated in a similar manner at those coarser resolutions. The estimated depths may be used to produce depth maps, e.g., depth maps 121, 122 illustrated in panel C, which have a number of applications. Aside from generating a 3D model of the scene, the depth maps 121 may be used in automatic segmentation and image-based rendering, among other things. For example, in automatic segmentation such as background removal, pixels within a prescribed depth interval may simply be thresholded. As another example, the scene may be directly visualized using the depth maps as a colored 3D point cloud via splat-based rendering, with the ability to look around occluding objects.

FIG. 2 illustrates a fine-to-coarse approach for depth estimation, according to an aspect of the disclosure. Panel A shows an image 201, which may be one of multiple images used to construct a 3D light field. Panels B-D illustrate iterations in fine-to-coarse depth estimation according to one configuration. In such fine-to-coarse depth estimation, regions where the depth estimation is expected to perform well may first be identified in the full-resolution of an EPI E using an edge confidence test. In one configuration, the depth estimation application may compute edge confidence measures $C_e$ for each EPI-pixel and generate a binary mask $M_e$ having value 1 for pixels for which $C_e$ is greater than a given threshold, and 0 otherwise.

Using binary mask $M_e$, the depth estimation application may generate depth estimates for EPI-pixels with high edge confidence. As discussed in greater detail below, the depth estimation application may, in one configuration, test a number of discrete depth hypotheses d and pick a depth that leads to a highest color density of sampled EPI-pixels. The depth estimate itself is used to improve the initial confidence toward a refined depth confidence $C_d$, which provides a good indicator of the reliability of particular depth estimates. The depth estimate may also be propagated throughout the EPI. This process of depth estimation and propagation may be iterated until all EPI-pixels with high edge confidence have been processed.

After one iteration, sufficiently detailed regions at the highest resolution level of the EPI E, have a reliable depth value assigned, while the depth in more homogenous regions (which were masked out) remain unknown. As shown in panel B, the gray bricks (e.g., brick 215) are among homogenous regions for which depth estimates are unavailable.

After estimating depth at the full resolution, the depth estimation application may iteratively downsample the EPI E to coarser resolutions. At each resolution level, the depth estimation application may determine edge confidence for EPI-pixels which are not yet processed, estimate depths of EPI-pixels with high edge confidence, and propagate the depth estimates. As shown in panels C-D, smaller portions of the gray bricks are among homogenous regions for which depth estimates remain unavailable at particular coarser resolutions. The iterative depth estimation process may be repeated until a depth value is assigned to every EPI-pixel, as shown in panel E.

FIG. 3 illustrates a method 300 for estimating depth in a scene, according to an aspect of the disclosure. As shown, the method 300 begins at step 310, where a depth estimation application receives a plurality of images of a scene, which together form a light field. In one configuration, a 3D light field may be constructed from multiple high-resolution two-dimensional images with optical centers distributed along a one-dimensional (1D) line, as discussed above.

At step 320, the depth estimation application generates EPIs from the plurality of images. For example, for 3D light fields, an EPI may be generated by simply stacking the same row v from all input images as a u-s slice of the light field L for a fixed v coordinate corresponds to an EPI.

For a given EPI, the depth estimation application determines edge confidence at step 330. In one configuration, the depth estimation application may compute the following difference measure:

$$C_e(u, s) = \Sigma_{u' \in \mathcal{N}(u,s)} \|E(u, s) - E(u', s)\|^2, \quad (1)$$

where $\mathcal{N}(u, s)$ is a 1D window in EPI E around pixel (u, s) and may be a small neighborhood (e.g., 9 pixels), as it may simply measure local color variation. $C_e$ may be fast to compute, and may be thresholded to give a binary confidence mask $M_e$. For example, the threshold may have value 0.02, with the binary confidence mask $M_e$ having value 1 for pixels for which $C_e$ is greater than 0.02, and 0 otherwise. Spurious isolated regions may also be removed by, e.g., applying a morphological opening operator to the mask $M_e$.

At step 340, the depth estimation application computes depth estimates for pixels in the given EPI which are above an edge confidence threshold. As discussed, a binary confidence mask $M_e$ may be determined. In such a case, the depth estimation application may compute depth estimates for those EPI pixels marked as confident in $M_e$ to prevent computing depth estimates at ambiguous EPI pixels, thereby speeding up depth computation without sacrificing accuracy. In one configuration, the depth estimates may be computed per scanline of an EPI, i.e., a fixed parameter ŝ may be selected and a depth estimate computed for E(u, ŝ) with $M_e(u, ŝ)=1$. In one configuration, the depth estimation application may begin by setting ŝ to a scanline at the center of the EPI, estimate depth for EPI-pixel of that scanline, propagate those estimates as discussed in greater detail below, then set ŝ to the nearest s with respect to the center of the EPI that still has unprocessed pixels, and so forth, until all edge-confident EPI-pixels have been processed or masked out during propagation.

The depth estimation application may assign a depth z, or equivalently a disparity d, to each EPI-pixel (u, ŝ). For a hypothetical disparity d, the set $\mathcal{R}$ of radiances or colors of EPI-pixels may be sampled as $$\mathcal{R}(u, d) = \{E(u+(\hat{s}-s)d, s) \mid s=1, \ldots, n\}, \quad (2)$$

where n is the number of views in the light field. From the density of radiance values in $\mathcal{R}(u, d)$, a depth score S(u, d) may be computed in linearized red-green-blue (RGB) color space. This assumes that that the scene is essentially Lambertian, i.e., that a set $\mathcal{R}$ is likely to represent an actual scene point if the radiance samples are densely positioned in the underlying color space.

In one configuration, the depth estimation application may compute the density using iterations of a modified Parzen window estimation with an Epanechnikov kernel, with the initial depth score defined as $$S(u, d) = \frac{1}{|\mathcal{R}(u, d)|} \sum_{r \in R(u,s)} K(r - \bar{r}), \quad (3)$$

where $\bar{r}=E(u, \hat{s})$ is the radiance value at the current EPI-pixel, and the kernel is $$K(x) = 1 - \left\|\frac{x}{h}\right\|^2 \text{ if } \left\|\frac{x}{h}\right\| \leq 1$$

and 0 otherwise. Here, h is the bandwidth parameter and may be set to, e.g., h=0.02. In alternative configurations, other kernels may be used such as Gaussian or other bell-shaped kernels. To reduce the influence of noisy radiance measurements, the depth estimation application may compute an iteratively updated radiance mean $$\bar{r} \leftarrow \frac{\sum_{r \in R} K(r - \bar{r}) r}{\sum_{r \in R} K(r - \bar{r})}$$

to plug into equation (3). Experience has shown that robustness to noise may be achieved after only a few iterations, e.g., 10 iterations.

For each EPI pixel (u, ŝ), the depth estimation application may compute scores S(u, ŝ) for an entire range of admissible disparities d, and assign the disparity with the highest score as the pixel's depth estimate $$D(u, \hat{s}) = \arg\max_d S(u, d). \quad (4)$$

The depth estimation application may further compute a refined confidence $C_d$ as a measure of reliability of the depth estimate. Low-confidence depth estimates may be discarded and marked for re-computation at a later stage. In one configuration, the refined confidence $C_d$ may combine the edge confidence $C_e$ with the difference between the maximum score $S_{max}=\max_d S(u, d)$ and the average score $\bar{S}=\Sigma_d S(u, d)$ $$C_d(u, \hat{s}) = C_e(u, \hat{s}) \|S_{max} - \bar{S}\|. \quad (5)$$

Note, the refined confidence $C_d$ combines two complementary measures. For example, noisy regions of an EPI would result in a high edge-confidence $C_e$, while a clear maximum $S_{max}$ is not available. Similarly, ambiguous homogenous regions in an EPI, where $C_e$ is low, can produce a strong, but insufficiently unique $S_{max}$. Each confident depth estimate, i.e., D(u, ŝ) where $C_d(u, s) > \epsilon$, may be stored as a line segment tuple l=(m, u, s, $\bar{r}^T$) in Γ, where $\bar{r}$ represents the mean radiance of $\mathcal{R}(u, d)$, and m is the slope of the line segment computed from d as m=1/d.

In one configuration, the depth estimation application may apply a median filter on the computed depths to attempt to eliminate the influence of outliers. A straightforward median filter may not result in the precise localization of silhouettes. The depth estimation application may instead use a bilateral median filter that preserves the localization of depth discontinuities by leveraging information from the radiance estimates of nearby EPIs. Such a bilateral median filter may be implemented by replacing depth values $D_v(u, \hat{s})$ with the median value of the set $$\{D_v(u', \hat{s}) \mid (u', v', \hat{s}) \in \mathcal{N}(u, v, \hat{s}),$$

$$\|E_v(u, \hat{s}) - E_v(u, \hat{s})\| \leq \epsilon$$

$$M_e(u', v', \hat{s})=1\}, \quad (6)$$

where (u', v', ŝ)∈$\mathcal{N}$(u, v, ŝ) denotes a small window over $I_s$ (e.g., a window of size 11×11 pixels), and the color tolerance threshold ϵ is, e.g., ϵ=0.1. Note, increasing the color tolerance ϵ and the kernel bandwidth h, discussed above, compared to other default values increases robustness to noise, whereas small values of ϵ and h preserve finer details. In equation (6), the second condition ensures that only EPI-pixels of similar radiance are considered, and the third condition masks out EPI-pixels lacking confidence for which no depth estimation is available.

At step 350, the depth estimation application propagates the depth estimates to other EPI-pixels. In one configuration, the depth estimate may be propagated along the slope of its corresponding EPI line segment to all EPI-pixels (u', ŝ) having a radiance similar to the mean radiance, i.e., ∥E(u', s')−$\bar{r}$∥<ϵ. This is a conservative visibility estimate and ensures that foreground objects in the EPI are not overwritten by background objects during propagation. In an alternative configuration, the depth estimation application may use full mean shift clustering, and propagate the depth estimate to cluster elements. As discussed, the depth estimation application may, after depth estimate propagation, set ŝ to the nearest s with respect to the center of the EPI that still has unprocessed pixels, and so forth, until all edge-confident EPI-pixels have been processes or masked out by propagation.

At step 360, where the depth estimation application iteratively downsamples the EPI and repeats, after each down-sampling, the determining of edge confidence of step 330, computing of depth estimates of step 340, and propagating of depth estimates of step 350. Parts of the EPI without assigned depth values were either previously ambiguous due to homogenous colors (i.e., insufficient edge confidence), or have strongly view-dependent appearance (i.e., insufficient depth confidence). A fine-to-coarse strategy may be used to compute depth in such less detailed and less reliable regions by exploiting the regularizing effect of an iterative downsampling of the EPI. Further, to enhance robustness and efficiency, the depth estimation application may use previously computed confident depth estimates as depth interval bounds for depth estimation at coarser resolutions.

In one configuration, the depth estimation application may use the upper and lower bounds of the closest reliable depth estimates in each horizontal row of the EPI as the depth bound estimates. Then the depth estimation application may downsample the EPI (e.g., by a factor of 0.5) along the spatial u and v directions, while the resolution along the angular s-dimension is preserved. The depth estimation application may presmooth the EPI along the spatial dimensions using, e.g., a 7×7 Guassian filter with standard deviation $\sigma=\sqrt{0.5}$ to avoid aliasing. After downsampling, the depth estimation application may perform edge confidence estimation, depth estimation, and propagation at the coarser resolution. EPI-pixels with reliable depth estimates computed at higher resolutions may not be considered again, aside from being used for deriving the depth bounds discussed above. This fine-to-coarse process may be iterated through all levels of the EPI pyramid until any of the image dimensions becomes less than a given size (e.g., 10 pixels). At the coarsest level, the depth estimation application may assign depth estimates to all pixels regardless of confidence.

At step 370, the depth estimation application successively upsamples depth estimates at coarse resolution levels to the respective higher resolution levels and assigns the estimates to the corresponding higher-resolution EPI-pixels without a depth estimate, until all EPI-pixels at the finest resolution level have a corresponding depth estimate. In one configuration, the depth estimation application may remove spurious speckles by, e.g., applying a 3×3 median.

If there are more EPIs, then at step 380, the method 300 returns to step 330, and another EPI is processed.

Note, unlike other techniques, the fine-to-coarse procedure discussed above starts at the highest resolution level and hence preserves greater detail, which tends to be challenging in coarse-to-fine multi-resolution approaches. Further, the downsampling discussed herein achieves an implicit regularization for less reliable depth estimates so that all processing steps are purely local at the EPI-level. As a result, even massive light fields can be processed efficiently.

FIG. 4 depicts a block diagram of a system in which an aspect may be implemented. As shown, the system 400 includes, without limitation, a central processing unit (CPU) 410, a network interface 430, an interconnect 415, a memory 460 and storage 420. The system 400 may also include an I/O device interface 440 connecting I/O devices 450 (e.g., keyboard, display and mouse devices) to the system 400.

The CPU 410 retrieves and executes programming instructions stored in the memory 460. Similarly, the CPU 410 stores and retrieves application data residing in the memory 460. The interconnect 615 facilitates transmission, such as of programming instructions and application data, between the CPU 410, I/O device interface 440, storage 420, network interface 430, and memory 460. CPU 410 is included to be representative of a single CPU, multiple CPUs, a single CPU having multiple processing cores, and the like. In other aspects, one or more graphics processing units (GPUs) may be used in lieu of, or in conjunction with, the CPU 410. Efficient GPU implementations are possible even on densely sampled light fields, as only a small number of EPIs (e.g., adjacent EPIs) may be operated on at any given time. For example, depth estimates may be computer per scanline, as discussed above, for simpler parallelization on the GPU.

The memory 460 is generally included to be representative of a random access memory. The storage 420 may be, e.g., a disk drive storage device. Further, system 400 is included to be representative of a physical computing system as well as virtual machine instances hosted on a set of underlying physical computing systems. Further still, although shown as a single computing system, one of ordinary skill in the art will recognized that the components of the system 400 shown in FIG. 4 may be distributed across multiple computing systems connected by a data communications network.

As shown, the memory 460 includes an operating system 461 and depth estimation application 462. Illustratively, the operating system may include Microsoft's Windows®. The depth estimation application 462 is configured to determine depth estimates based on light fields. In one configuration, the depth estimation application 462 may, given input images 421, generate EPIs, determine edge confidence for EPI-pixels, estimate depths of EPI-pixels with high edge confidence, propagate the depth estimates, and repeat this process with iteratively downsampled EPIs, according to the method 300 discussed above.

Although discussed above primarily with respect to a regularly sampled 3D light field, techniques disclosed herein may be readily adapted to other light fields, such as 4D light fields and unstructured light fields. In a regular 4D light field, camera centers are horizontally and vertically displaced, leading to a 4D parameterization of rays as r=L(u, v, s, t), where t denotes the vertical ray origin. The ray sampling of equation (2) may then be extended to $$\mathcal{R}_{(u, v, s, t, d)} = \{L(u+(\hat{s}-s)d, v+(\hat{t}-t)d, s, t) | s=1, \ldots, n, t=1, \ldots, m\}, \quad (7)$$

where $(\hat{s}, \hat{t})$ is the considered view and m denotes the number of vertical viewing positions. As a result, sampling may be performed in a 2D plane in a 4D ray space, as opposed to the 1D line in the case of 3D light fields. The depth propagation may then take place along both s- and t-directions.

For arbitrary, unstructured input, camera poses may be estimated to determine the set of sampled rays for a depth hypothesis. For example, camera poses may be estimated, using structure-from-motion techniques, from the input images of a scene that are used to construct a light field. Having the camera poses means that the relative positions and orientations are known of the camera viewpoints for all input images. With this information available, it can be determined where a scene point is projected in each input image, and the pixels collected from those projected positions in input images form the set of sampled rays mentioned above.

In one configuration, each considered pixel may be sent to 3D space in accordance with the hypothesized depth, and then the 3D position may be re-projected to the image coordinate systems of all other views to obtain the sampling positions. The set of sampled rays becomes $$\mathcal{R}_{(u, v, s, d)} = \{L(u', v', s) | s=1, \ldots, n, P_s^{-1}[u' v' f \, d]^T = P_{\hat{s}}^{-1}[u \, v \, f \, d]^T\}, \quad (8)$$

where $P_s$ denotes the camera projection matrix of view s, and f is the camera focal length.

Advantageously, techniques disclosed herein permit depth to be estimated based on light fields. Such depth estimates have a number of applications, including generating a 3D model of the scene, automatic segmentation, and image-based rendering, among other things. Techniques disclosed herein can operate at the single pixel level, resulting in precise contours at depth continuities, even for highly detailed scenes that are challenging for traditional stereo-based approaches. Global regularization is avoided by a fine-to-coarse approach that reconstructs reliable depth estimates at the highest resolution level first, and then proceeds to lower resolutions. Further, at any time only a small number of EPIs (e.g., adjacent EPIs) may be operated on, enabling an efficient GPU implementation even on densely sampled light fields captured using current camera hardware. In addition, use of densely sampled light fields permits techniques disclosed herein to handle some occlusions and scene inconsistencies such as moving elements.

The foregoing description references aspects of the disclosure. However, it should be understood that the disclosure is not limited to specific described aspects. Instead, any combination of the following features and elements, whether related to different aspects or not, is contemplated to implement and practice the disclosure. Furthermore, although aspects of the disclosure may achieve advantages over other possible solutions and over the prior art, whether or not a particular advantage is achieved by a given aspect is not limiting of the disclosure. Thus, the following aspects, features, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may be embodied as a system, method or computer program product. Accordingly, aspects of the present disclosure may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various aspects of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and flowchart illustrations, and combinations of blocks in the block diagrams and flowchart illustrations can be implemented by special-purpose hardware-based systems that perform the specified functions or acts, or combinations of special purpose hardware and computer instructions.

While the foregoing is directed to aspects of the present disclosure, other and further aspects may be devised without departing from the basic scope thereof, and the scope thereof is determined by the claims that follow.

What is claimed is:

1. A computer-implemented method, comprising:
    receiving a plurality of images of a scene; and
    estimating, from the received images, depths of scene points at multiple image resolution levels beginning from a finest resolution level and iteratively proceeding to coarser resolution levels,
    wherein, during each iteration, a respective resolution level is processed by performing steps including:
        determining, based on at least local color variation, edge confidence scores for scene points for which depth estimates have not been assigned at any previous iteration,
        determining sufficiently detailed regions of the scene at the resolution level, the sufficiently detailed regions being regions in which the edge confidence scores of scene points exceed a threshold value, and
        determining depth estimates for scene points in the sufficiently detailed regions.

2. The method of claim 1, wherein:
    estimating depths of scene points at the multiple image resolution levels includes generating epipolar-plane images (EPIs) from the plurality of images, the EPIs being iteratively downsampled to coarser resolutions; and
    during each of the iterations, for each of the EPIs:
        determining the edge confidence scores for the scene points includes determining edge confidence scores for pixels of the EPI,
        determining depth estimates for scene points in the sufficiently detailed regions includes determining depth estimates for pixels of the EPI associated with edge confidence scores above the threshold value, and
        the determined depth estimates are propagated to other pixels of the EPI.

3. The method of claim 2, wherein the plurality of images have optical centers distributed along a one-dimensional (1D) line, capturing a three-dimensional (3D) light field.

4. The method of claim 3, wherein the depth estimates are determined per scanline.

5. The method of claim 2, further comprising, during each of the iterations:
    determining scores indicating reliability of the depth estimates made during the iteration; and
    discarding depth estimates made during the iteration that are associated with reliability scores less than a reliability threshold value.

6. The method of claim 2, wherein determining a depth estimate for one of the pixels of the EPI includes:
    sampling, based on each of a plurality of hypothetical depths, radiances of pixels in the EPI corresponding to respective hypothetical depths; and
    assigning depth of the one of the pixels as one of the hypothetical depths that is associated with sampled radiances most densely positioned in an underlying color space.

7. The method of claim 2, wherein, in determining depth estimates for the pixels of the EPI during each of the iterations, one or more depth estimates determined at previous iterations, if any, are used as depth bounds.

8. The method of claim 2, further comprising, applying a median filter on the depth estimates.

9. The method of claim 8, wherein the median filter is a bilateral median filter which is aware of local radiance distribution, edge confidence, and availability of depth estimation.

10. The method of claim 1, wherein determining a depth estimate for one of the scene points in the sufficiently detailed regions includes:
sampling, based on each of a plurality of hypothetical depths, radiances of pixels, corresponding to the respective hypothetical depths, in a light field constructed from the received images, wherein poses of a camera are estimated to determine sampled rays for the hypothetical depths; and
assigning depth of the one of the scene points as one of the hypothetical depths that is associated with sampled radiances most densely positioned in an underlying color space.

11. The method of claim 1, wherein the plurality of images have optical centers horizontally and vertically displaced from each other, capturing a four-dimensional (4D) light field.

12. The method of claim 1, wherein the plurality of images are captured in an unstructured manner.

13. The method of claim 1, wherein the plurality of images are captured by one of a camera array and a moving camera.

14. A non-transitory computer-readable storage medium storing instructions, which when executed by a computer system, perform operations comprising:
receiving a plurality of images of a scene; and
estimating, from the received images, depths of scene points at multiple resolution levels beginning from a finest resolution level and iteratively proceeding to coarser resolution levels,
wherein, during each iteration, a respective resolution level is processed by performing steps including:
determining, based on at least local color variation, edge confidence scores for scene points for which depth estimates have not been assigned at any previous iteration,
determining sufficiently detailed regions of the scene at the resolution level, the sufficiently detailed regions being regions in which the edge confidence scores of scene points exceed a threshold value, and
determining depth estimates for scene points in the sufficiently detailed regions.

15. The computer-readable storage medium of claim 14, wherein:
estimating depths of scene points at the multiple image resolution levels includes generating epipolar-plane images (EPIs) from the plurality of images, the EPIs being iteratively downsampled to coarser resolutions; and
during each of the iterations, for each of the EPIs:
determining the edge confidence scores for the scene points includes determining edge confidence scores for pixels of the EPI,
determining depth estimates for scene points in the sufficiently detailed regions includes determining depth estimates for pixels of the EPI associated with edge confidence scores above the threshold value, and
the determined depth estimates are propagated to other pixels of the EPI.

16. The computer-readable storage medium of claim 15, wherein the plurality of images have optical centers distributed along a one-dimensional (1D) line, capturing a three-dimensional (3D) light field.

17. The computer-readable storage medium of claim 16, wherein the depth estimates are determined per scanline.

18. The computer-readable storage medium of claim 15, the operations further comprising, during each of the iterations:
determining scores indicating reliability of the depth estimates made during the iteration; and
discarding depth estimates made during the iteration that are associated with reliability scores less than a reliability threshold value.

19. The computer-readable storage medium of claim 15, wherein determining a depth estimate for one of the pixels of the EPI includes:
sampling, based on each of a plurality of hypothetical depths, radiances of pixels in the EPI corresponding to respective hypothetical depths; and
assigning depth of the one of the pixels as one of the hypothetical depths that is associated with sampled radiances most densely positioned in an underlying color space.

20. The computer-readable storage medium of claim 15, wherein, in determining depth estimates for the pixels of the EPI during each of the iterations, one or more depth estimates determined at previous iterations, if any, are used as depth bounds.

21. The computer-readable storage medium of claim 15, the operations further comprising, applying a median filter on the depth estimates.

22. The computer-readable storage medium of claim 21, wherein the median filter is a bilateral median filter which is aware of local radiance distribution, edge confidence, and availability of depth estimation.

23. The computer-readable storage medium of claim 14, wherein determining a depth estimate for one of the scene points in the sufficiently detailed regions includes:
sampling, based on each of a plurality of hypothetical depths, radiances of pixels, corresponding to the respective hypothetical depths, in a light field constructed from the received images, wherein poses of a camera are estimated to determine sampled rays for the hypothetical depths; and
assigning depth of the one of the scene points as one of the hypothetical depths that is associated with sampled radiances most densely positioned in an underlying color space.

24. The computer-readable storage medium of claim 14, wherein the plurality of images have optical centers horizontally and vertically displaced from each other, capturing a four-dimensional (4D) light field.

25. The computer-readable storage medium of claim 14, wherein the plurality of images are captured in an unstructured manner.

26. The computer-readable storage medium of claim 14, wherein the plurality of images are captured by one of a camera array and a moving camera.

27. A system, comprising:
a processor; and
a memory, wherein the memory includes an application program configured to perform operations, the operations comprising:

receiving a plurality of images of a scene, and
estimating, from the received images, depths of scene points at multiple resolution levels beginning from a finest resolution level and iteratively proceeding to coarser resolution levels,
wherein, during each iteration, a respective resolution level is processed by performing steps including:
  determining, based on at least local color variation, edge confidence scores for scene points for which depth estimates have not been assigned at any previous iteration;
  determining sufficiently detailed regions of the scene at the resolution level, the sufficiently detailed regions being regions in which the edge confidence scores of scene points exceed a threshold value; and
  determining depth estimates for scene points in the sufficiently detailed regions.

* * * * *